US011881144B2

(12) United States Patent
Park

(10) Patent No.: US 11,881,144 B2
(45) Date of Patent: Jan. 23, 2024

(54) IMAGE DATA CORRECTOR AND DISPLAY DEVICE HAVING THE SAME

(71) Applicant: SAMSUNG DISPLAY CO., LTD., Yongin-si (KR)

(72) Inventor: Jong Woong Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/986,742

(22) Filed: Nov. 14, 2022

(65) Prior Publication Data

US 2023/0073526 A1 Mar. 9, 2023

Related U.S. Application Data

(63) Continuation of application No. 17/240,863, filed on Apr. 26, 2021, now Pat. No. 11,501,685.

(30) Foreign Application Priority Data

Jul. 16, 2020 (KR) ........................ 10-2020-0088430

(51) Int. Cl.
*G09G 3/20* (2006.01)

(52) U.S. Cl.
CPC ......... *G09G 3/2007* (2013.01); *G09G 3/2096* (2013.01); *G09G 2320/0233* (2013.01); *G09G 2320/0276* (2013.01); *G09G 2360/06* (2013.01)

(58) Field of Classification Search
CPC ............... G09G 3/2007; G09G 3/2096; G09G 2320/0233; G09G 2320/0276; G09G 2360/16
See application file for complete search history.

(56) References Cited

U.S. PATENT DOCUMENTS

| | | | |
|---|---|---|---|
| 9,666,145 B2 | 5/2017 | Chen et al. |
| 11,018,199 B2 | 5/2021 | Hei et al. |
| 2009/0135127 A1 | 5/2009 | Lee et al. |
| 2014/0111558 A1 | 4/2014 | Ishitani et al. |
| 2015/0255025 A1 | 9/2015 | Chen et al. |
| 2019/0086725 A1 | 3/2019 | Ishii |
| 2021/0065606 A1 | 3/2021 | Park |
| 2021/0098541 A1 | 4/2021 | Hei et al. |

FOREIGN PATENT DOCUMENTS

| | | |
|---|---|---|
| JP | 2019-053208 | 4/2019 |
| KR | 10-0826197 | 4/2008 |
| KR | 10-2021-0027605 | 3/2021 |

OTHER PUBLICATIONS

Non-Final Office Action dated Mar. 17, 2022, issued to U.S. Appl. No. 17/240,863.

Notice of Allowance dated Jul. 8, 2022, issued to U.S. Appl. No. 17/240,863.

*Primary Examiner* — Gene W Lee

(74) *Attorney, Agent, or Firm* — H.C. Park & Associates, PLC

(57) ABSTRACT

A display device includes: a pixel unit including first pixels disposed in a first pixel area and second pixels disposed in a second pixel area; an image data corrector adjusting a limit grayscale of first image data corresponding to the first pixel area based on a dimming level defining a maximum luminance at which the pixel unit is able to emit light, and correcting the first image data based on the limit grayscale; a data driver supplying data signals to the pixel unit based on the corrected first image data and second image data corresponding to the second pixel area; and a scan driver supplying scan signals to the pixel unit.

18 Claims, 10 Drawing Sheets

IMAGE DATA CORRECTOR AND DISPLAY DEVICE HAVING THE SAME

CROSS-REFERENCE TO RELATED APPLICATIONS

This application is a continuation of U.S. patent application Ser. No. 17/240,863, filed on Apr. 26, 2021, which claims priority from and the benefit of Korean Patent Application No. 10-2020-0088430, filed Jul. 16, 2020, which are hereby incorporated by reference for all purposes as if fully set forth herein.

BACKGROUND

Field

Exemplary embodiments of the invention relate generally to a display device, and, more particularly, to a display device that may control luminance differently according to a position in a pixel unit.

Discussion of the Background

A display device may display an image by using a pixel (or a pixel circuit). The display device may include a sensor, a camera, and the like in a bezel (or an edge portion) of a front surface (for example, a surface on which an image is displayed) thereof. For example, the display device may recognize an object by using an optical sensor, and may acquire a photo and/or a video by using the camera.

Recently, the camera or similar elements have been disposed to overlap a pixel area to minimize the bezel. In order to improve transmittance of an area in which a camera is disposed, resolution of the overlapping area may be designed to be less than that of other display areas, and luminance of the areas may be different due to this difference in the resolution.

The above information disclosed in this Background section is only for understanding of the background of the inventive concepts, and, therefore, it may contain information that does not constitute prior art.

SUMMARY

Devices constructed according to exemplary embodiments of the invention are capable of providing a display device that may limit a maximum grayscale (limit grayscale) of image data corresponding to a first pixel area having a low resolution based on a dimming level and may control an output grayscale of the limit grayscale or lower.

Devices constructed according to exemplary embodiments of the invention are capable of providing an image data compensator included in the display device.

Additional features of the inventive concepts will be set forth in the description which follows, and in part will be apparent from the description, or may be learned by practice of the inventive concepts.

One or more exemplary embodiments of the present invention provide a display device including: a pixel unit including first pixels disposed in a first pixel area and second pixels disposed in a second pixel area; an image data corrector adjusting a limit grayscale of first image data corresponding to the first pixel area based on a dimming level defining a maximum luminance at which the pixel unit is able to emit light, and correcting the first image data based on the limit grayscale; a data driver supplying data signals to the pixel unit based on the corrected first image data and second image data corresponding to the second pixel area; and a scan driver supplying scan signals to the pixel unit.

The number of the first pixels disposed per unit area may be smaller than the number of the second pixels.

The image data corrector may include a limit grayscale controller determining the limit grayscale of the first image data based on a ratio between the dimming level and a preset reference luminance.

The reference luminance may be a luminance of the first pixel area when the first pixels emit light by maximum driving currents that are able to be generated in the first pixels.

An output grayscale that is converted and outputted from an input grayscale greater than or equal to the limit grayscale may be less than or equal to the limit grayscale.

A voltage of the data signal supplied to the first pixel and a voltage of the data signal supplied to the second pixel may be different from each other with respect to the same input grayscale greater than or equal to the limit grayscale.

The limit grayscale corresponding to a first dimming level may be less than the limit grayscale corresponding to a second dimming level, and the maximum luminance of the first dimming level may be greater than the maximum luminance of the second dimming level.

A grayscale range of the corrected first image data corresponding to the first dimming level may be smaller than a grayscale range of the first image data corresponding to the second dimming level.

A grayscale range of the corrected first image data may be smaller than a grayscale range of the second image data.

The image data corrector may further include a grayscale mapper non-linearly mapping an input grayscale and an output grayscale of the first image data based on the limit grayscale.

The image data corrector may further include a grayscale booster boosting input grayscales in a first grayscale range based on a ratio between the reference luminance and the dimming level, and the first grayscale range may include the input gray scales smaller than the limit grayscale.

The grayscale booster may determine a boost ratio by using the ratio between the reference luminance and the dimming level, and may determine the first grayscale range by using the boost ratio and the limit grayscale.

A first data signal supplied to the first pixel and a second data signal supplied to the second pixel may be different with respect to a first input grayscale included in the first grayscale range.

A third data signal supplied to the first pixel and a fourth data signal supplied to the second pixel may be different with respect to a second input grayscale greater than or equal to the limit grayscale.

A voltage of the first data signal may be smaller than that of the second data signal, and a voltage of the third data signal may be greater than that of the fourth data signal.

A first output grayscale corresponding to the first input grayscale at the first dimming level may be greater than a second output grayscale corresponding to the first input grayscale at the second dimming level, and The maximum luminance of the first dimming level may be greater than the maximum luminance of the second dimming level.

The image data corrector may further include a grayscale mapper non-linearly mapping the input grayscale and the output grayscale of the first image data based on the limit grayscale and the boost ratio.

One or more exemplary embodiments of the present invention provide an image data corrector that may correct image data of pixels of a first pixel area of a pixel unit including the first pixel area and a second pixel area. The image data corrector may include a limit grayscale controller determining a limit grayscale of the image data based on a ratio between a dimming level defining a maximum luminance of the pixel unit and a preset reference luminance of the first pixel area.

The reference luminance may be a luminance of the first pixel area when the pixels emit light by maximum driving currents that are able to be generated in the pixels of the first pixel area.

The image data corrector may further include a grayscale booster determining a boost ratio by using a ratio between the reference luminance and the dimming level and determining the first grayscale range by using the boost ratio and the limit grayscale, and a grayscale mapper non-linearly mapping an input grayscale and an output grayscale of the image data based on the limit grayscale and the boost ratio, A maximum boost grayscale included in the first grayscale range may be smaller than the limit grayscale.

The image data corrector and the display device including the same according to the embodiments of the present invention may adaptively limit a grayscale and gamma voltage of image data corresponding to a first pixel area having a relatively low pixel density based on a dimming level. Therefore, driving of a high luminance and high grayscale that cannot be implemented in the first pixel area may be blocked in advance through image data correction. Accordingly, a data signal corresponding to an unnecessary grayscale value may not be supplied to the first pixel area, a gamma characteristic of an output of the first pixel area may not be distorted, and driving transistors of first pixels may operate relatively stably.

In addition, the image data corrector and the display device including the same according to the embodiments of the invention may adaptively boost grayscales other than the limited input grayscale according to a dimming level. Therefore, luminance of the first pixel area for an input grayscale of a middle grayscale (for example, about 100 grayscales) or lower may be increased. Accordingly, when an image is displayed based on input image data of the middle grayscale or lower, a difference in luminance between the first and second pixel areas having different resolutions may be minimized.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
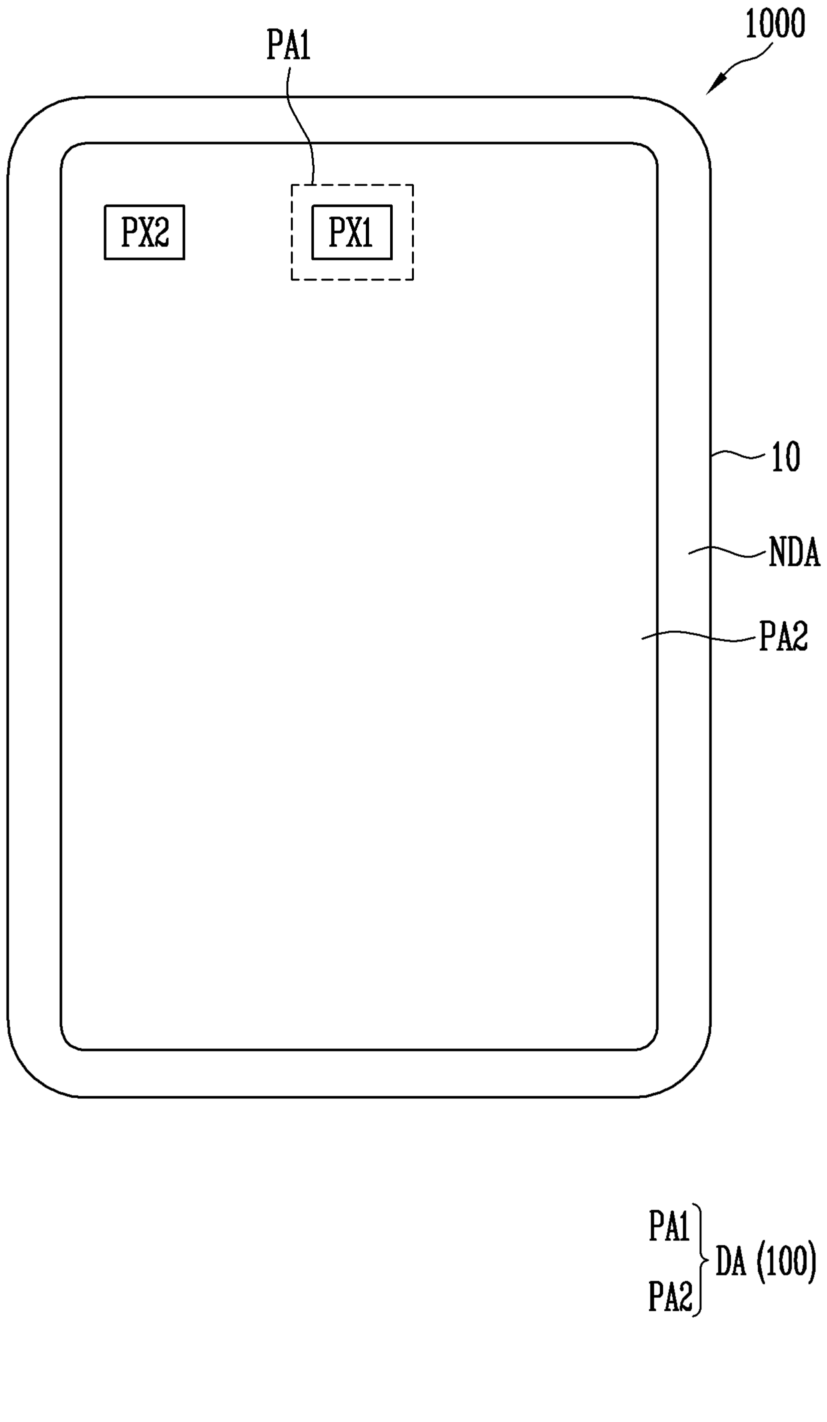
FIG. 1 illustrates a schematic view of a display device according to exemplary embodiments of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an exemplary embodiment of the present invention will be described in detail with reference to the accompanying drawings. The same reference numerals are used for the same constituent elements on the drawings, and duplicate descriptions for the same constituent elements are omitted.

Figure 2:
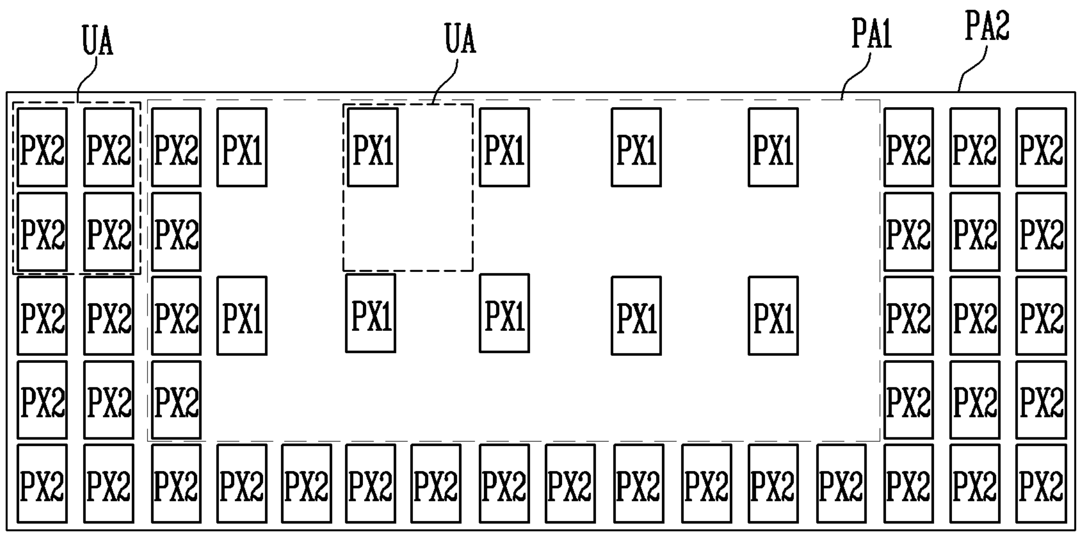
FIG. 2 illustrates a schematic view of an example of a portion of a pixel unit of the display device of FIG. 1.

FIG. 1 illustrates a schematic view of a display device according to embodiments of the present invention, and FIG. 2 illustrates a schematic view of an example of a portion of a pixel unit of the display device of FIG. 1.

Referring to FIGS. 1 and 2, a display device 1000 may include a display panel 10 including a pixel unit 100.

The display panel 10 may include a display area DA and a non-display area NDA. Pixels PX1 and PX2 may be arranged in the display area DA, and various drivers for driving the pixels PX1 and PX2 may be arranged in the non-display area NDA.

The display portion DA may correspond to the pixel unit 100 including a plurality of pixels PX1 and PX2. The pixel unit 100 may include a first pixel area PA1 and a second pixel area PA2. The first pixels PX1 may be arranged in the first pixel area PA1, and the second pixels PX2 may be arranged in the second pixel area PA2.

In the embodiment, the first pixel PX1 and the second pixel PX2 may have the same structure, and may include transistors of substantially the same size. However, this is an example, and a size (for example, a ratio of a channel width to a channel length) of a driving transistor included in the first pixel PX1 may be different from a size (for example, a ratio of a channel width to a channel length) of a driving transistor included in the second pixel PX2.

In the embodiment, as shown in FIG. 2, the number (density) of the first pixels PX1 disposed per unit area UA may be smaller than the number (density) of the second pixels PX2. For example, while one first pixel PX1 is disposed in the unit area UA, four second pixels PX2 may be included in the unit area UA. Therefore, resolution of the first pixel area PA1 may be lower than that of the second pixel area PA2.

Since an aperture ratio (and transmittance of external light) of the first pixel area PA1 is higher than that of the second pixel area PA2, a camera, an optical sensor, and the like may be disposed to overlap the first pixel area PA1. The optical sensor may include a biometric information sensor such as a fingerprint sensor, an iris recognition sensor, or an artery sensor. However, this is an example, and the optical sensor of an optical sensing method may further include, without limitation, a gesture sensor, a motion sensor, a proximity sensor, an illuminance sensor, and an image sensor.

When the first pixels PX1 and the second pixels PX2 emit light based on the same data signal, emission luminance may be different due to the above-described difference in resolution. For example, when the first pixel PX1 and the second pixel PX2 emit light based on image data for displaying luminance of 1000 nits, the luminance of the first pixel area PA1 may be about ¼ of the luminance of the second pixel area PA2. Accordingly, a difference in luminance between the first pixel area PA1 and the second pixel area PA2 may be viewed during high luminance emission.

A driving current for the first pixel PX1 may be larger than that for the second pixel PX2 in order to reduce a luminance difference between areas when such high luminance (for example, luminance of about 700 nits or more) is displayed. For example, the driving current may be increased by designing a channel width of the driving transistor of the first pixel PX1 larger than that of the driving transistor of the second pixel PX2. However, it is difficult to realize stable high luminance in the first pixel area PA1 due to limitations in the manufacturing processes of the driving transistor included in the pixel, limitations in characteristics of the driving transistor, and differences in dispersion thereof.

In addition, even if a gate-source voltage Vgs of the driving transistor is increased to increase the driving current, there is a limit to how much the driving current may be increased due to the transistor's inherent voltage-current characteristics (i.e., a relation between the gate-source voltage Vgs and a drain current Id). In this case, a grayscale (and luminance) corresponding to a data signal (that is, gamma voltage) cannot be outputted, and in high luminance and high grayscale areas, gamma characteristics (for example, luminance according to a 2.2 gamma curve) that may be displayed in the second pixel area PA2 cannot be realized.

For example, when being driven at high luminance and high grayscale, the same driving current is generated for all grayscales at a predetermined grayscale or higher, and a possibility of occurrence of a characteristic change and an operation error according to stress applied to the driving transistor may increase. That is, when the limit of the driving current of the driving transistor is taken into account, a data signal generating the necessary gate-source voltage Vgs or more does not need to be supplied to the driving transistor.

For the first pixel area PA1 in which high luminance is not displayed as in the second pixel area PA2, a method of previously blocking driving of the high luminance area to prevent and minimize stress and operation errors of the driving transistor may be applied to the display device 1000 according to embodiments of the present invention. Accordingly, when being driven at a high luminance such as a high brightness mode (HBM), the grayscale and gamma voltage of the image data corresponding to the first pixel area PA1 may be controlled at a predetermined reference or less. That is, a data signal corresponding to a value less than or equal to a predetermined grayscale is supplied to the first pixel area PA1, thus the gamma characteristic of the output of the first pixel area PA1 may not be distorted, and the driving transistor may operate relatively stably.

Figure 3:
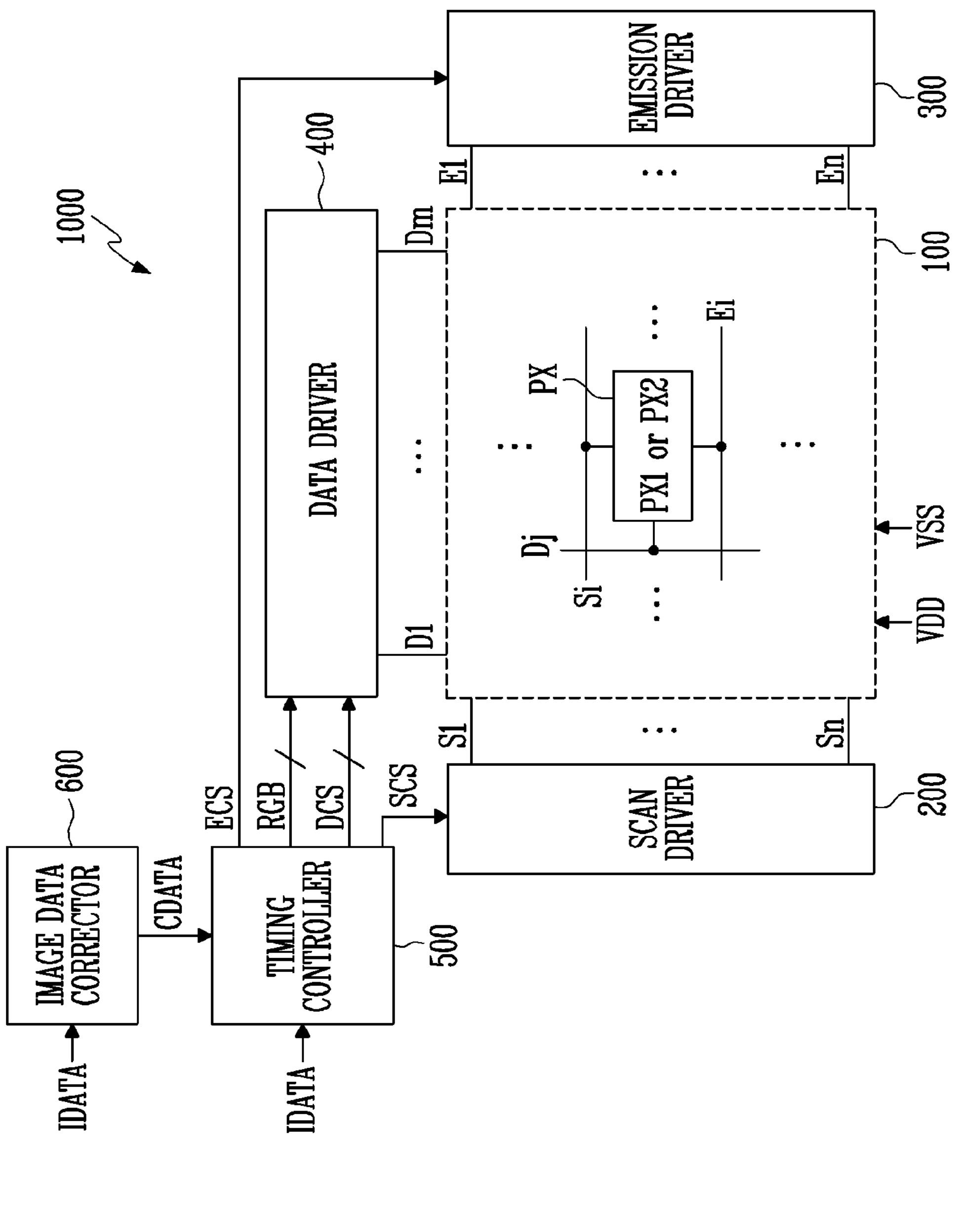
FIG. 3 illustrates a block diagram of a display device according to exemplary embodiments of the invention.

FIG. 3 illustrates a block diagram of a display device according to embodiments of the present invention.

Referring to FIGS. 1 to 3, the display device 1000 may include a pixel unit 100, a scan driver 200, an emission driver 300, a data driver 400, a timing controller 500, and an image data corrector 600.

The pixel unit 100 may include scan lines S1 to Sn, emission control lines E1 to En, data lines D1 to Dm, and pixels PX connected to the scan lines S1 to Sn, the emission control lines E1 to En, and the data lines D1 to Dm (herein, m and n are an integer greater than 1). Each of the pixels PX may include a driving transistor and a plurality of switching transistors. In the embodiment, the pixel unit 100 may include the first pixel area PA1 and the second pixel area PA2 described above with reference to FIGS. 1 and 2. A first pixel PX1 may be included in the first pixel area PA1, and a second pixel PX2 may be included in the second pixel area PA2. The first pixel PX1 and the second pixel PX2 may have substantially the same structure or different structures.

The timing controller 500 may generate a first control signal SCS, a second control signal ECS, and a third control signal DCS in response to synchronization signals supplied from the outside. The first control signal SCS may be supplied to the scan driver 200, the second control signal ECS may be supplied to the emission driver 300, and the third control signal DCS may be supplied to the data driver 400. In addition, the timing controller 500 may rearrange image data DATA and/or corrected image data CDATA supplied from the outside to supply the rearranged image data signal RGB to the data driver 400.

The scan driver 200 may receive the first control signal SCS from the timing controller 500, and supply a scan signal to the scan lines S1 to Sn based on the first control signal SCS. For example, the scan driver 200 may sequentially supply the scan signal to the scan lines S1 to Sn.

A transistor included in the pixel PX and receiving the scan signal may be turned on in response to a gate-on level of the scan signal.

The emission driver 300 may receive the second control signal ECS from the timing controller 500, and supply an emission control signal to the emission control lines E1 to En based on the second control signal ECS. For example, the emission driver 300 may sequentially supply the light emission control signal to the emission control lines E1 to En.

A transistor included in the pixel PX and receiving the emission control signal may be turned on in response to a gate-on level of the emission control signal. The emission control signal is used to control an emission time of the pixels PX. To this end, a gate-off period of the emission control signal may be set longer than a gate-on period of the scan signal.

The scan driver 200 and the emission driver 300 may be mounted on a substrate through a thin film process, respectively. In addition, the scan driver 200 may be disposed at both sides with the pixel unit 100 interposed therebetween. The emission driver 300 may also be disposed at both sides with the pixel unit 100 interposed therebetween.

In addition, although it is illustrated in FIG. 3 that the scan driver 200 and the emission driver 300 respectively supply the scan signal and the emission control signal, the present invention is not limited thereto. For example, the scan signal and the emission control signal may be supplied by one driver.

The data driver 400 may receive the third control signal DCS and the image data signal RGB from the timing controller 500. The data driver may convert the image data signal RGB into an analog data signal. The data driver 400 may supply a data signal to the data lines D1 to Dm in response to the third control signal DCS. The data signal may be supplied to the pixels PX selected by the scan signal.

Meanwhile, although n scan lines S1 to Sn and n emission control lines E1 to En are shown in FIG. 1, respectively, the present invention is not limited thereto. For example, additional dummy scan lines and/or dummy emission control lines not shown may be additionally formed in the pixel unit 100.

The image data corrector 600 may adjust a limit grayscale of the first image data corresponding to the first pixel area PA1 based on a dimming level. For example, the image data corrector 600 may extract the first image data from the image data DATA provided from an external graphic processor or the like to correct the first image data. Here, the dimming level may be defined as a maximum luminance that the pixel unit 100 may emit light. For example, when the dimming level is set to 1000 nits, the pixel unit 100 may emit light up to maximum 1000 nits. When the dimming level is set to 100 nits, the pixel unit 100 may emit light up to maximum 100 nits. The control of the maximum luminance (dimming level) may be implemented through correction of a gamma voltage corresponding to image data and/or width control of an emission control signal.

The image data corrector 600 may correct the first image data based on the limit grayscale. The corrected first image data (for example, CDATA) may be provided to the timing controller 500. The second image data corresponding to the second pixel area PA2 may be supplied to the timing controller 500 without correction by the image data corrector 600.

The timing controller 500 may rearrange the corrected first image data (for example, CDATA) and second image data to provide it to the data driver 400.

In the embodiment, the image data corrector 600 may boost predetermined input grayscales less than or equal to the limit grayscale. Accordingly, the emission luminance of low grayscale may be increased.

In the embodiment, the display device 1000 may further include a power supply portion that supplies driving power sources VDD and VSS for driving the pixel PX to the pixel unit 100.

Meanwhile, although the data driver 400, the timing controller 500, and the image data corrector 600 are shown as separate configurations in FIG. 1, at least some of functions of the data driver 400, the timing controller 500, and the image data corrector 600 may be integrated in a form of an integrated circuit (IC). In addition, the display device 1000 may further include a compensation block for compensating for degradation of the pixel PX and/or an after-image of an image and IR drop of a data signal. The compensation block may process the corrected image data CDATA outputted from the image data corrector 600 to provide it to the timing controller 500.

Hereinafter, a configuration and function of the image data corrector 600 will be described with reference to FIGS. 4 to 9C.

Figure 4:
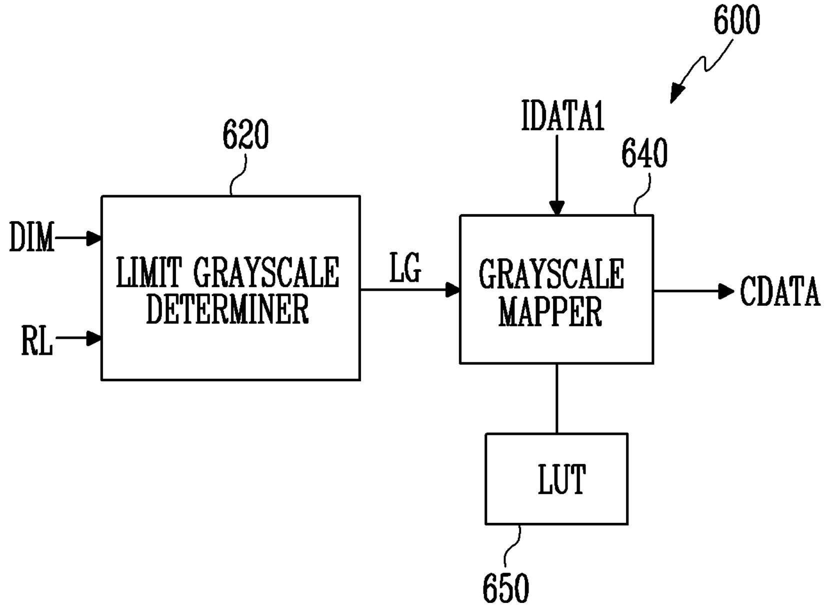
FIG. 4 illustrates a block diagram of an example of an image data corrector included in the display device of FIG. 3.

FIG. 4 illustrates a block diagram of an example of an image data corrector included in the display device of FIG. 3.

Referring to FIGS. 1, 2, and 4, the image data corrector 600 may include a limit grayscale controller 620, a grayscale mapper 640, and a lookup table 650.

The limit grayscale controller 620 may determine a limit grayscale LG of a first image data IDATA1 based on a ratio between a dimming level DIM and a preset reference luminance RL. In the embodiment, the reference luminance RL may be a luminance of the first pixel area PA1 when the first pixel PX1 emits light by a maximum driving current that may be generated in the first pixels PX1. That is, the reference luminance RL may be a luminance that may be displayed at the maximum in the first pixel area PA1.

The reference luminance RL may be determined by an experiment during a manufacturing process, and may be stored in a memory of the display device 1000. For example, the reference luminance RL may be set to 500 nits.

The limit grayscale controller 620 may calculate the ratio between the dimming level DIM and the reference luminance RL. In this case, when the dimming level DIM is equal to or lower than the reference luminance RL, an operation of setting the limit grayscale of the image data corrector 600 and correction of the first image data IDATA1 are not performed. Since the first pixel area PA1 may emit light with the luminance of the corresponding dimming level DIM, there is no need to set a limit grayscale.

The limit grayscale LG may be a maximum grayscale applied to the first pixel area PA1. For example, when the grayscale of the display device 1000 is displayed by 8 bits, the image data may be represented by 0 to 255 grayscales. When the limit grayscale LG is 200 grayscales, a maximum value of the grayscale of the first pixel area PA1 supplied to the data driver 400 may be 200 grayscales.

In the embodiment, an output grayscale that is converted and outputted from an input grayscale greater than or equal to the limit grayscale may be less than or equal to the limit grayscale LG. For example, when the input grayscale is in an range of 200 grayscales to 255 grayscales, the corresponding output grayscale may be 200 grayscales or less.

Accordingly, a voltage of the data signal supplied to the first pixel PX1 may be different from a voltage of the data signal supplied to the second pixel PX2, with respect to the same input grayscale greater than or equal to the limit grayscale LG. For example, when the pixels PX1 and PX2 include p-channel driving transistors and the input grayscale is 250 grayscales, the voltage of the data signal supplied to the first pixel PX1 may be greater than the voltage of the data signal supplied to the second pixel PX2. In contrast, when the pixels PX1 and PX2 include n-channel driving transistors and the input grayscale is 250 grayscales, the voltage of the data signal supplied to the first pixel PX1 may be smaller the voltage of the data signal supplied to the second pixel PX2. Therefore, during high luminance and high grayscale light emitting, the luminance of the second pixel PX2 may be higher than the luminance of the first pixel PX1.

When the reference luminance RL is 500 nits and the dimming level DIM is 1000 nits, the ratio between the dimming level DIM and the reference luminance RL may be determined to be 0.5. That is, the first pixel area PA1 may emit light up to 50% of the dimming level DIM. In this case, the limit grayscale LG may be calculated by a relationship between the luminance and the digital grayscale value, and may be represented by Equation 1 below.

$$(LG)^{gamma} = A*(MG)^{gamma} \quad \text{[Equation 1]}$$

Here, LG is a limit grayscale, A is a ratio between the dimming level DIM and the reference luminance RL, MG is a maximum grayscale applied to the display device 1000, and gamma is a gamma constant applied to gamma conversion of image data. For example, when a gamma 2.2 curve is applied, gamma may be 2.2.

(LG)gamma may represent the luminance at the limit grayscale LG, and (MG)gamma may represent the luminance at the maximum grayscale. Accordingly, a relationship of Equation 1 may be established according to the ratio A between the dimming level DIM and the reference luminance RL.

From Equation 1, the limit grayscale LG may be calculated as shown in Equation 2.

$$LG=(A)^{1/gamma}*MG \quad \text{[Equation 2]}$$

In this case, the ratio A between the dimming level DIM and the reference luminance RL may be less than one. For example, when the ratio A between the dimming level DIM and the reference luminance RL is 0.5 and the gamma value is 2.2, the limit grayscale LG may be calculated as 186 grayscales, which is an approximation of the result by Equation 2.

Accordingly, a grayscale range of the corrected first image data IDATA1 may be smaller than that of the second image data in which the correction is not reflected.

Meanwhile, as the dimming level DIM is increased according to the definition of Equation 2, the limit grayscale LG may be reduced. That is, the limit grayscale LG may be adjusted according to a change in the dimming level DIM.

In the embodiment, the limit grayscale LG may be equally set for the red/blue/green pixels. In another embodiment, the limit grayscale LG for red/blue/green pixels may be set by different methods and as different values to prevent color distortion.

The grayscale mapper 640 may generate an output grayscale in which the input grayscale of the first image data IDATA1 is converted based on the limit grayscale LG. The first image data IDATA1 may be converted into the corrected first image data CDATA through the grayscale mapper 640.

In the embodiment, the grayscale mapper 640 may convert the input grayscale to the output grayscale by using the lookup table 650. The lookup table 650 stores the relationship between the input grayscale and the output grayscale set according to the dimming level DIM or the limit grayscale LG. For example, the lookup table 650 may include a formula or a table in which the output grayscale nonlinearly increases as the input grayscale increases. In addition, the lookup table 650 may include a plurality of lookup tables including different types of formulas or tables according to the dimming level DIM or the limit grayscale LG.

The grayscales converted by the grayscale mapper 640 may be outputted as the corrected first image data CDATA. The corrected first image data CDATA may be provided to the timing controller 500 or the data driver 400.

Figure 5A:
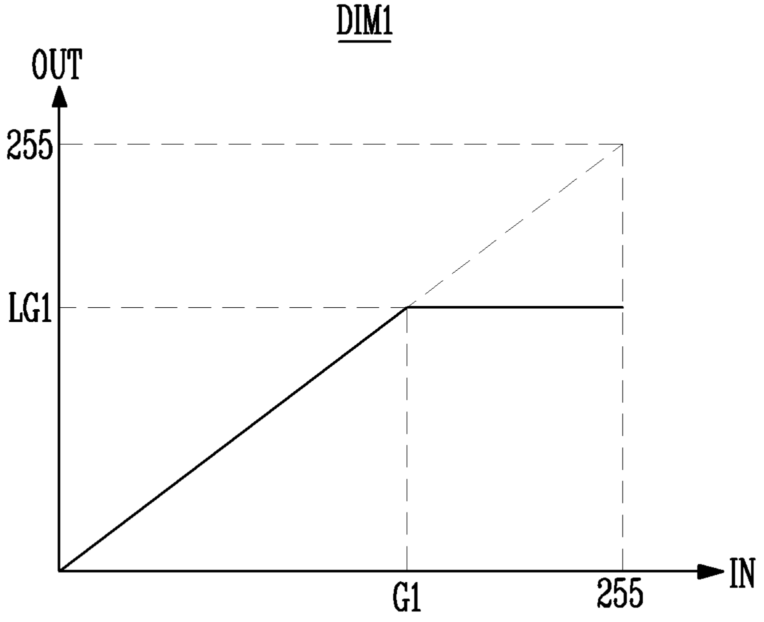
FIGS. 5A, 5B, and 5C illustrate graphs of an example of corrected first image data outputted from the image data corrector of FIG. 3.
Figure 5B:
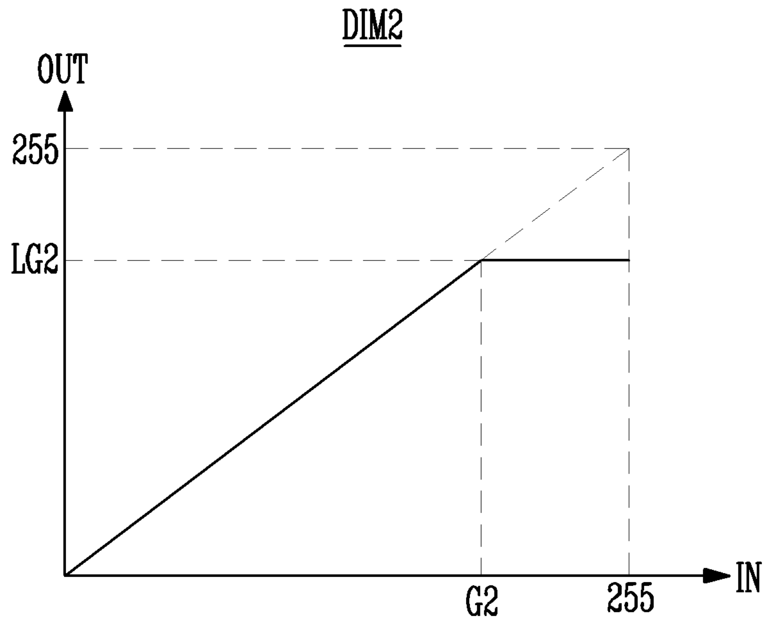
Figure 5C:
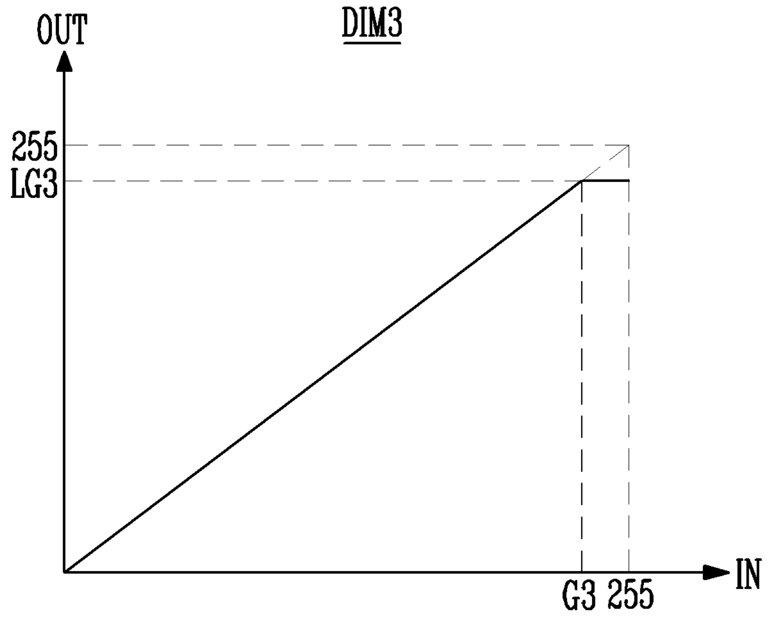

FIGS. 5A to 5C illustrate graphs of an example of corrected first image data outputted from the image data corrector of FIG. 3.

Referring to FIGS. 2 to 5C, the limit grayscale LG may vary according to the dimming level DIM.

FIGS. 5A to 5C show examples in which the grayscale mapper 640 of the image data corrector 600 linearly maps the input grayscale and the output grayscale. For example, the input grayscale and the output grayscale may be the same in grayscales less than or equal to limit grayscales LG1, LG2, and LG3.

As shown in FIG. 5A, in a luminance (or brightness) mode to which a first dimming level DIM1 is applied, a first limit grayscale LG1 may be determined. When the image data corrector 600 does not operate, an input grayscale IN may be outputted as an output grayscale OUT as it is. For example, when the input grayscale IN is 255 grayscales, the output grayscale OUT may be 255 grayscales.

A first grayscale G1 and a first limit grayscale LG1 may be the same grayscale. When the input grayscale IN is greater than or equal to the first grayscale, the corresponding output grayscale OUT may be outputted as the first limit grayscale LG1.

As shown in FIG. 5B, in a luminance mode to which a second dimming level DIM2 is applied, a second grayscale G2 may be determined as a second limit grayscale LG2. In the embodiment, a maximum luminance of the first dimming level DIM1 may be greater than that of the second dimming level DIM2. For example, the maximum luminance of the first dimming level DIM1 may be about 2000 nits, and the maximum luminance of the second dimming level DIM2 may be about 1500 nits.

In this case, according to Equation 2, the second limit grayscale LG2 may have a value greater than that of the first limit grayscale LG1. Accordingly, a grayscale range between the second limit grayscale LG2 and a highest grayscale in the second dimming level DIM2 may be smaller than that between the first limit grayscale LG1 and a highest grayscale in the first dimming level DIM1.

A grayscale range of the corrected first image data CDATA corresponding to the first dimming level DIM1 may range between 0 grayscale and the first grayscale G1, and a grayscale range of the corrected first image data CDATA corresponding to the second dimming level DIM2 may range between 0 grayscale and the second grayscale G2. Accordingly, the grayscale range of the corrected first image data CDATA corresponding to the first dimming level DIM1 may be smaller than that of the first image data CDATA corresponding to the second dimming level DIM2.

As shown in FIG. 5C, in a luminance mode to which a third dimming level DIM3 is applied, a third grayscale G3 may be determined as a third limit grayscale LG3. In the embodiment, a maximum luminance of the second dimming level DIM2 may be greater than that of the third dimming level DIM3. For example, the maximum luminance of the third dimming level DIM3 may be about 1000 nits.

Hereinafter, respective maximum luminance of the first dimming level DIM1, the second dimming level DIM2, and the third dimming level DIM3 will be described on the assumption that they are 2000 nits, 1500 nits, and 1000 nits. In addition, it is assumed that the reference luminance RL is 500 nits. However, this is an example, and the setting is for explaining the relative difference between the dimming levels DIM1, DIM2, and DIM3 and the reference luminance RL, and the maximum luminance and the reference luminance RL are not limited thereto.

As such, the limit grayscales LG1, LG2, and LG3 may be determined based on the ratio between the maximum luminance of the dimming level and the reference luminance (RL) and Equation 2. Therefore, driving of a high luminance and high grayscale that cannot be implemented in the first pixel area PA1 may be blocked in advance through image data correction. Accordingly, a data signal corresponding to an unnecessary grayscale value may not be supplied to the first pixel area PA1, a gamma characteristic of an output of the first pixel area PA1 may not be distorted, and driving transistors of first pixels PX1 may operate relatively stably.

Figure 6A:
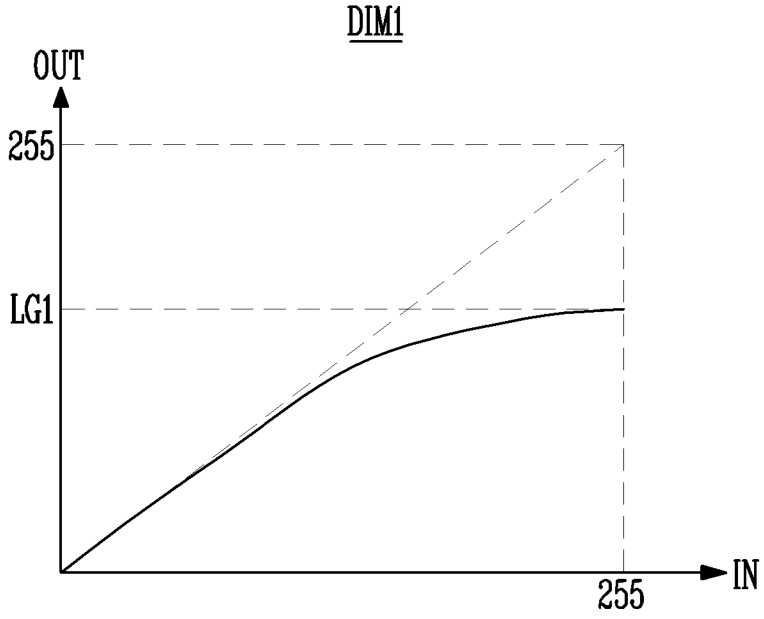
FIGS. 6A, 6B, and 6C illustrate graphs of another example of corrected first image data outputted from the image data corrector of FIG. 3.
Figure 6B:
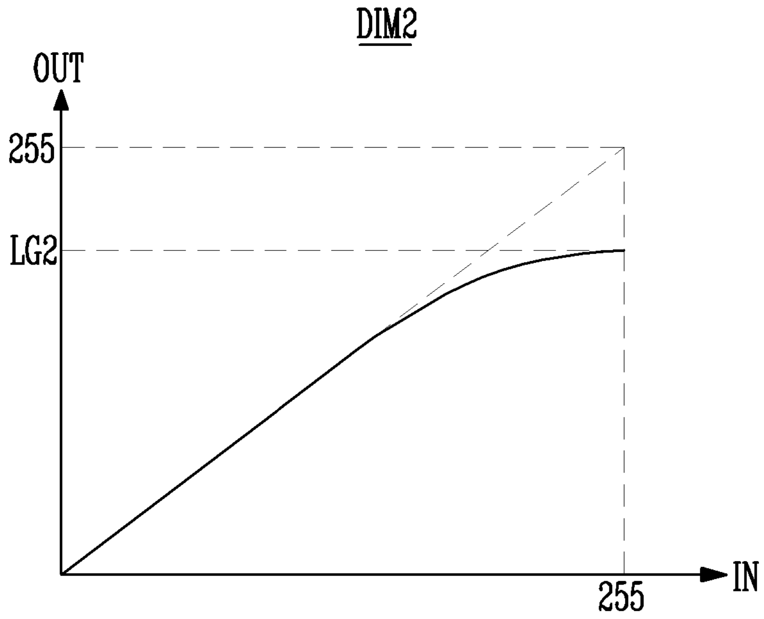
Figure 6C:
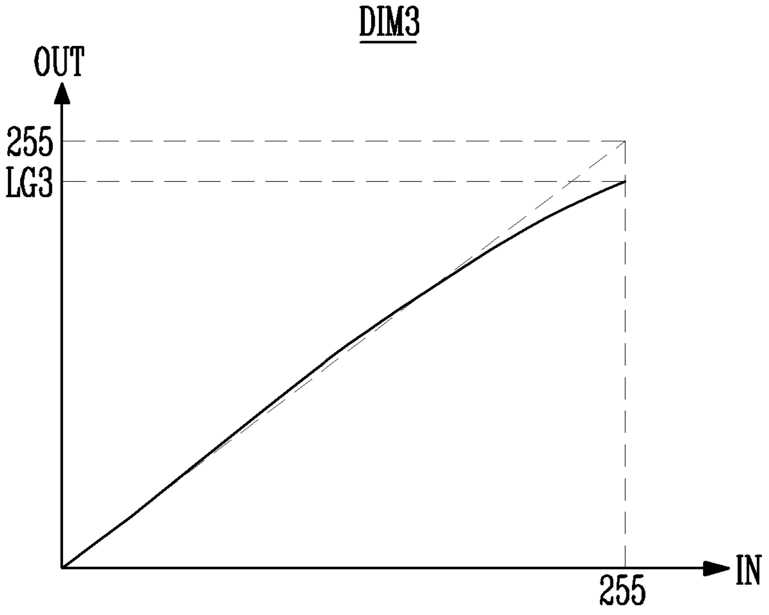

FIGS. 6A to 6C illustrate graphs of another example of corrected first image data outputted from the image data corrector of FIG. 3.

Referring to FIGS. 2 to 6C, the grayscale mapper 640 may nonlinearly map the input grayscale IN and the output grayscale OUT of the first image data IDATA1 based on the limit grayscales LG1, LG2, and LG3.

As shown in FIG. 5A, all of the input grayscales IN greater than or equal to the first grayscale G1 may be outputted as the limit grayscale LG1 (that is, the first grayscale G1). Accordingly, an area of a high grayscale greater than or equal to the first grayscale G1 may be displayed as the first grayscale G1 in a lumpy form, resulting in a problem that image quality is deteriorated.

The grayscale mapper 640 may nonlinearly set the relationship between the input grayscale IN and the output grayscale OUT so that the output grayscales OUT may be smoothly changed and outputted with respect to all the input grayscales IN. For example, as shown in FIG. 6A, the input/output relationship of the grayscale may be reset by the grayscale mapper 640 such that the input grayscale IN and the output grayscale OUT may correspond to each other one-to-one. In this case, the output grayscale OUT may be set so as not to exceed the limit grayscale LG1.

By the operation of the grayscale mapper 640, the relationship between the input grayscale IN and the output grayscale OUT of FIG. 5B and FIG. 5C may be corrected to a nonlinear relationship as illustrated in FIG. 6B and FIG. 6C.

As such, the image quality of the high grayscale area may be improved by the operation of the grayscale mapper 640.

Figure 7:
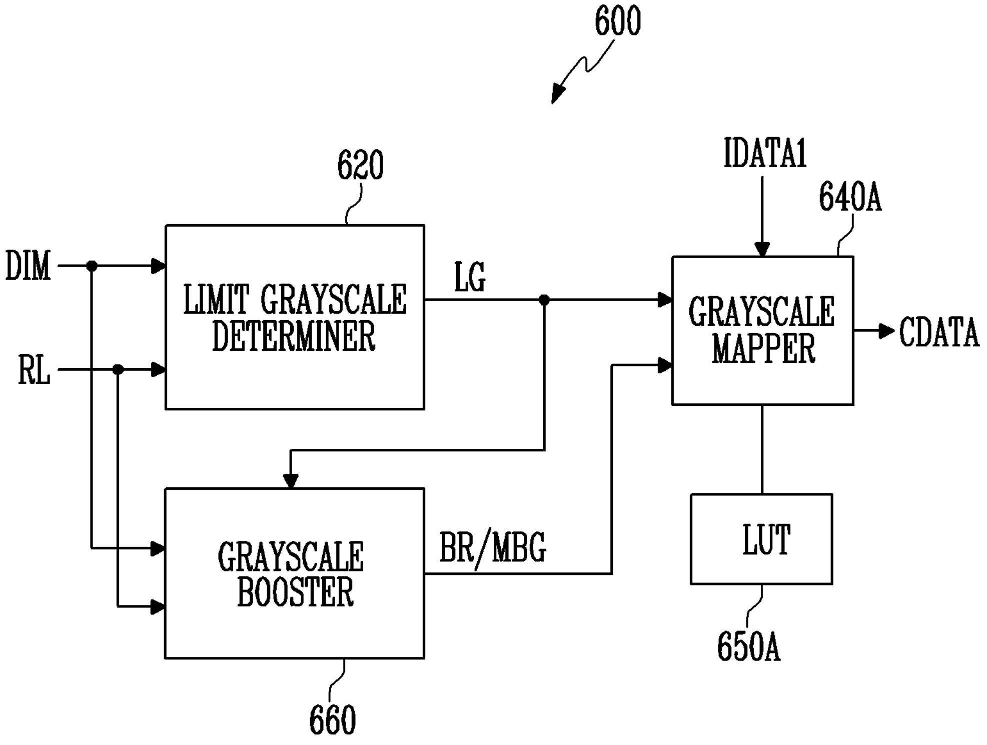
FIG. 7 illustrates a block diagram of another example of an image data corrector included in the display device of FIG. 3.

FIG. 7 illustrates a block diagram of another example of an image data corrector included in the display device of FIG. 3.

In FIG. 7, the same reference numerals are used for the same or similar elements described above with reference to FIG. 4, and redundant descriptions will be omitted.

Referring to FIGS. 1, 2, and 7, an image data corrector 600A may include a limit grayscale controller 620, a grayscale mapper 640A, a lookup table 650A, and a grayscale booster 660.

Information of a limit grayscale LG generated by the limit grayscale controller 620 may be provided to the grayscale booster 660 and the grayscale mapper 640A.

The grayscale booster 660 may boost input grayscales IN of a first grayscale range (for example, GR1 of FIG. 8A) based on a ratio between a reference luminance RL and a dimming level DIM. The first grayscale range may include input grayscales smaller than the limit grayscale. In other words, the input grayscales (for example, low grayscales) smaller than the limit grayscale LG may be converted into a grayscale value larger than the input grayscale to be outputted.

Luminance of the first pixel PX1 for the same input grayscale IN included in the first grayscale range (GR1 of FIG. 8A) may be greater than that of the second pixel PX2. However, since resolution of the first pixel area PA1 is lower than that of the second pixel PA2, when the entire pixel unit 100 is viewed, luminance of the first pixel area PA1 may be similar to that of the second pixel area PA2.

Hereinafter, for convenience of description, a function of the grayscale booster 660 will be described with reference to FIG. 8A.

The grayscale booster 660 may determine a boost ratio BR by using the ratio between the reference luminance RL and the dimming level DIM. The boost ratio BR may be a multiple (or, parameter) that boosts an output grayscale (OUT in FIG. 8A) with respect to an input grayscale (IN in FIG. 8A). In the embodiment, as in Equation 1, since luminance may be represented by $(\text{grayscale})^{gamma}$, the boost ratio BR may be calculated by Equation 3 and Equation 4 below.

$$L\_ratio = \frac{DIM\_L}{RL\_L} = \frac{(O\_G)^{gamma}}{(I\_G)^{gamma}} \quad \text{[Equation 3]}$$

Here, DIM_L is a maximum luminance value corresponding to the dimming level DIM, RL_L is a luminance value of the reference luminance RL, and L_ratio is a luminance ratio that is a ratio of the reference luminance (RL) to the maximum luminance value. I_G is an input grayscale IN, O_G is an output grayscale OUT corresponding to the input grayscale IN, and gamma is a gamma constant applied to gamma conversion of image data. Accordingly, the boost ratio BR corresponding to a ratio of the output grayscale OUT to the input grayscale IN may be calculated by Equation 4 below.

$$BR = \frac{(O\_G)}{(I\_G)} = (L\_ratio)^\wedge(1/gamma) \quad \text{[Equation 4]}$$

For example, when the luminance ratio L_ratio is 2 and 2.2 gamma is applied, the boost ratio BR may be determined to be about 1.37. That is, the output grayscale OUT corresponding to the input grayscale IN of the first grayscale range GR1 may have a grayscale value about 1.37 times the input grayscale IN. As described above, in a predetermined low grayscale range of the same dimming level condition, the output grayscale OUT in which a boost ratio BR greater than 1 is applied to the input grayscale may be greater than the output grayscale to which the boost ratio BR is not applied. Input grayscales IN (for example, low grayscales) smaller than the limit grayscale may be converted to a grayscale value larger than the input grayscale IN to be outputted.

In addition, according to Equation 4, the smaller the luminance ratio L_ratio, the smaller the boost ratio BR may be. That is, as the maximum luminance due to the dimming level DIM decreases, the boost ratio BR may decrease.

In the embodiment, the grayscale booster 660 may determine the first grayscale range GR1 to which a grayscale boost is applied using the boost ratio BR. The grayscale booster 660 may determine a maximum boost grayscale MBG, which is a maximum value of an input grayscale to which a grayscale boost is applied.

The maximum boost grayscale MBG may be determined by the boost ratio BR and the limit grayscale LG. For example, the maximum boost grayscale MBG may be calculated based on a value (that is, it can be represented by LG/BR) obtained by dividing the limit grayscale LG by the boost ratio BR, and it is represented as G1' in FIG. 8A.

For example, when the boost ratio BR is 1.2 and the limit grayscale LG is 200 grayscales, the maximum boost grayscale MBG may be determined as 166 grayscales. In this case, the boost ratios BR may be multiplied by the input grayscales of 166 grayscales or less, and the input grayscales larger than 166 grayscales may be outputted as 200 grayscales, which are the limit grayscales LG.

When data signals respectively supplied to the first and second pixels PX1 and PX2 are generated after the input grayscale IN included in the first grayscale range GR1 is corrected by the image data corrector 600A, the first data signal supplied to the first pixel PX1 may be different from the second data signal supplied to the second pixel PX2. For example, when the driving transistor of each of the first and second pixels PX1 and PX2 is a p-channel driving transistor, the first data signal may be smaller than the second data signal. When the driving transistor of each of the first and second pixels PX1 and PX2 is an n-channel driving transistor, the first data signal may be larger than the second data signal.

Therefore, a driving current in the first pixel PX1 may be greater than that in the second pixel PX2, and luminance of the first pixel PX1 may be greater than that of the second pixel PX2. Accordingly, when an image is displayed in the low grayscale area, the luminance of the first pixel area PA1 and the luminance of the second pixel area PA2 may be similar.

Meanwhile, when a data signal based on an input grayscale IN greater than or equal to the limit grayscale is generated, a driving current caused by a third data signal supplied to the first pixel PX1 may be smaller than that caused by a fourth data signal supplied to the second pixel PX2.

For example, when the driving transistor of each of the first and second pixels PX1 and PX2 is a p-channel driving transistor, the third data signal may be larger than the fourth data signal. When the driving transistor of each of the first and second pixels PX1 and PX2 is an n-channel driving transistor, the third data signal may be smaller than the fourth data signal.

Therefore, driving of a high luminance and high grayscale that cannot be implemented in the first pixel area PA1 may be blocked in advance through image data correction. Accordingly, a data signal corresponding to an unnecessary grayscale value is not supplied to the first pixel area PA1.

In the embodiment, the image data corrector 600A may further include the grayscale mapper 640A. The grayscale mapper 640A may generate an output grayscale in which the input grayscale of the first image data IDATA1 is converted based on the limit grayscale LG. The first image data IDATA1 may be converted into the corrected first image data CDATA through the grayscale mapper 640A.

In the embodiment, the grayscale mapper 640A may convert the input grayscale to the output grayscale by using the lookup table 650A. For example, the lookup table 650A may include a formula or a table in which the output grayscale nonlinearly increases as the input grayscale increases. Since functions of the grayscale mapper 640A are described in detail with reference to FIG. 4, description of duplicate contents will be omitted.

Figure 8A:
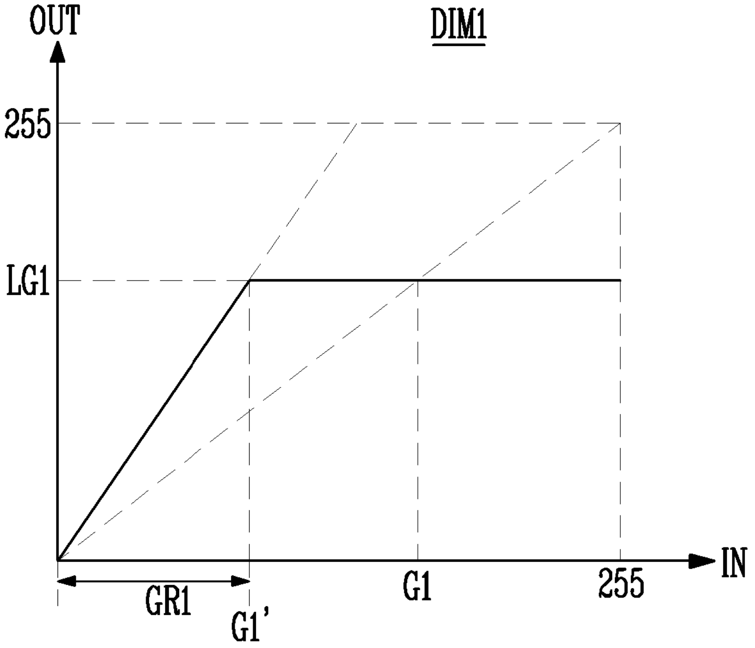
FIGS. 8A, 8B, and 8C illustrate graphs of an example of corrected first image data outputted from the image data corrector of FIG. 7.
Figure 8B:
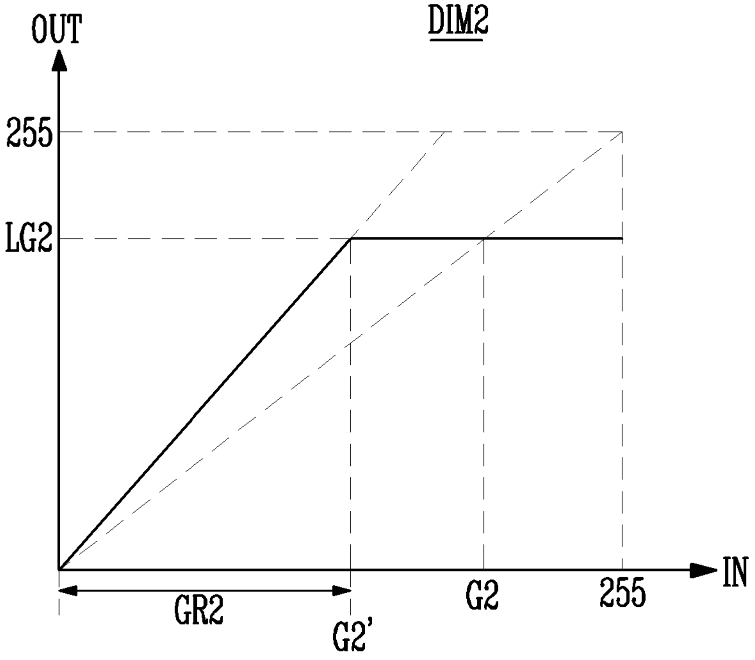
Figure 8C:
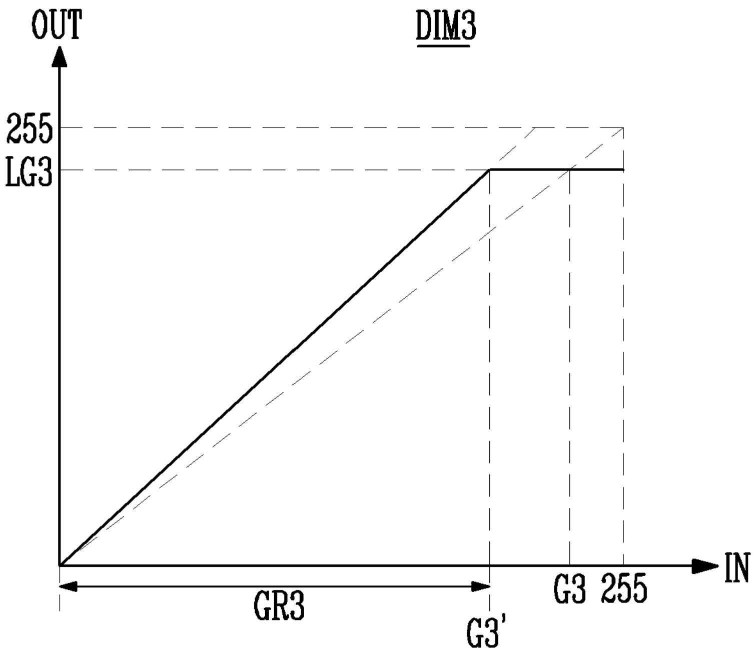

FIGS. 8A to 8C illustrate graphs of an example of corrected first image data outputted from the image data corrector of FIG. 7.

Referring to FIGS. 2, 3, 7, 8A, 8B, and 8C, the limit grayscale LG and the boost ratio BR may be different according to the dimming level DIM. The maximum luminance of the first dimming level DIM1 is greater than the maximum luminance of the second dimming level DIM2, and the maximum luminance of the second dimming level DIM2 is greater than the maximum luminance of the third dimming level DIM3.

FIG. 8A to 8C show examples in which input grayscales IN included in the first grayscale ranges GR1, GR2, and GR3 of the input grayscale IN are boosted by the grayscale booster 660.

As shown in FIG. 8A, in a luminance mode to which a first dimming level DIM1 is applied, a first limit grayscale LG1 may be determined by the limit grayscale controller 620. As described with reference to FIG. 7, the grayscale booster 660 may determine the boost ratio BR and the maximum boost grayscale MBG (G1').

The input grayscales IN included in the first grayscale range GR1 may be boosted and outputted based on the boost ratio BR. The input grayscales IN larger than the maximum boost grayscale G1' may be outputted as the first limit grayscale LG1.

As shown in FIG. 8B, in a luminance mode to which a second dimming level DIM2 is applied, a second limit grayscale LG2 larger than the first limit grayscale LG1 may be set by Equation 2. In addition, the boost ratio BR may be calculated by Equation 4. Since the boost ratio BR in the luminance mode of the second dimming level DIM2 having a relatively low luminance ratio is smaller than the boost ratio BR according to FIG. 8A, a slope of a graph of the second grayscale range GR2 of FIG. 8B may be smaller than a slope of a graph of the first grayscale range GR1 of FIG. 8A. The input grayscales IN included in the second grayscale range GR2 may be boosted and outputted. The input grayscales IN larger than the maximum boost grayscale G2' may be outputted as the second limit grayscale LG2.

As shown in FIG. 8C, in a luminance mode to which a third dimming level DIM3 is applied, a third limit grayscale LG3 larger than the second limit grayscale LG2 may be set. In addition, a boost ratio BR smaller than the boost ratio derived from FIG. 8B may be calculated by Equation 4. Therefore, a slope of a graph of the third grayscale range GR3 of FIG. 8C may be smaller than that of the graph of the second grayscale range GR2 of FIG. 8B. The input grayscales IN included in the third grayscale range GR3 may be boosted and outputted. The input grayscales IN larger than the maximum boost grayscale G3' may be outputted as the third limit grayscale LG3.

As described above, the input grayscales IN less than or equal to the maximum boost grayscales MBG, G1', G2', and G3' may be boosted at different ratios according to the dimming level DIM, so that the image data of the first pixel area PA1 may be corrected. Accordingly, the luminance of the first pixel area PA1 with respect to the input grayscale IN less than or equal to a middle grayscale may be increased. Accordingly, when an image is displayed based on input image data of the middle grayscale (for example, about 100 grayscales) or lower, a difference in luminance between the first and second pixel areas PA1 and PA2 having different resolutions may be minimized.

Figure 9A:
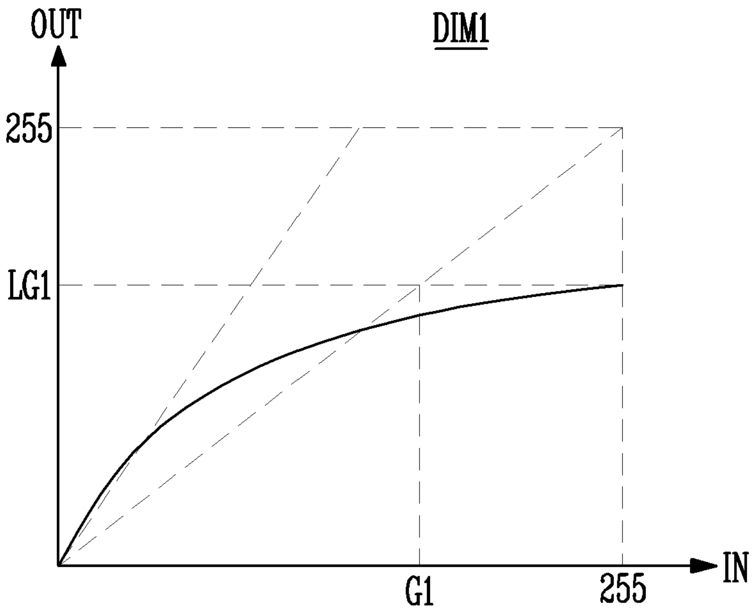
FIGS. 9A, 9B, and 9C illustrate graphs of another example of corrected first image data outputted from the image data corrector of FIG. 7.
Figure 9B:
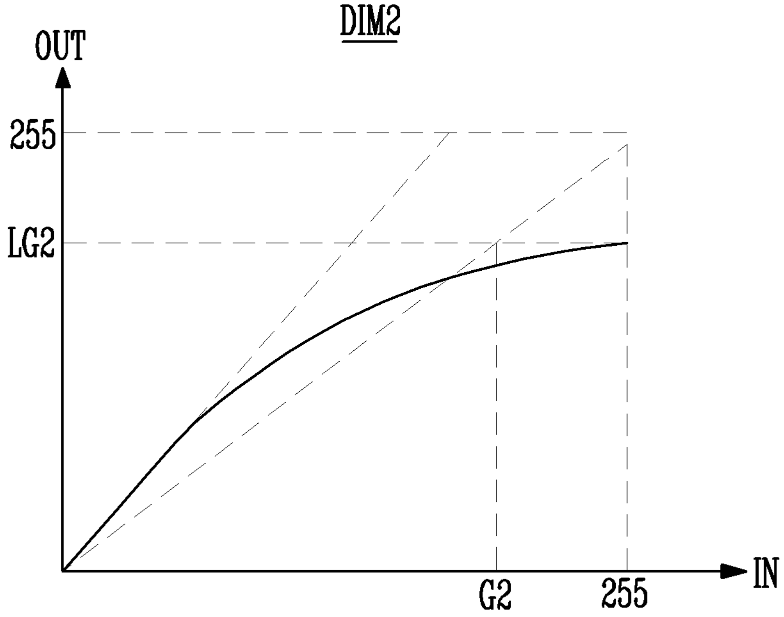
Figure 9C:
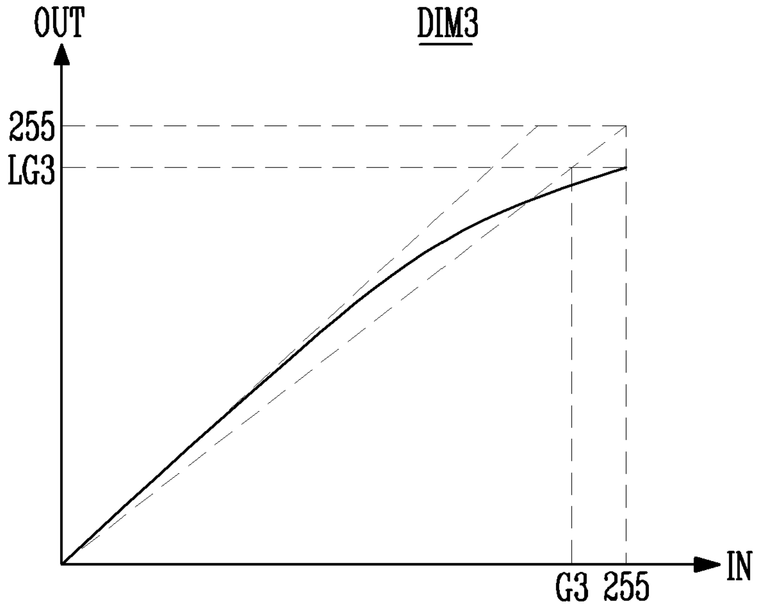

FIGS. 9A to 9C illustrate graphs of another example of corrected first image data outputted from the image data corrector of FIG. 7.

Referring to FIGS. 7 to 9C, the grayscale mapper 640A may nonlinearly map the input grayscale IN and the output grayscale OUT of the first image data IDATA1 based on the limit grayscales LG1, LG2, and LG3.

The grayscale mapper 640A may nonlinearly set the relationship between the input grayscale IN and the output grayscale OUT so that the output grayscales OUT may be smoothly changed and outputted with respect to all the input grayscales IN. For example, the input/output relationship of the grayscale may be reset by the grayscale mapper 640A such that the input grayscale IN and the output grayscale OUT may correspond to each other one-to-one. In this case, the output grayscale OUT may be set so as not to exceed the limit grayscale LG1.

By the operation of the grayscale mapper 640A, the relationship between the input grayscale IN and the output grayscale OUT of FIGS. 8A to 8C may be corrected to a nonlinear relationship as illustrated in FIGS. 9A to 9C. As such, grayscale aggregation in the high grayscale area may be minimized and image quality may be improved, by the operation of the grayscale mapper 640A.

As described above, the image data corrector and the display device including the same according to the embodiments of the present invention may adaptively limit a grayscale and gamma voltage of image data corresponding to a first pixel area having a relatively low pixel density based on a dimming level. Therefore, driving of a high luminance and high grayscale that cannot be implemented in the first pixel area may be blocked in advance through image data correction. Accordingly, a data signal corresponding to an unnecessary grayscale value may not be supplied to the first pixel area, a gamma characteristic of an output of the first pixel area may not be distorted, and driving transistors of first pixels may operate relatively stably.

In addition, the image data corrector and the display device including the same according to the embodiments of the invention may adaptively boost grayscales other than the limited input grayscale according to a dimming level. Therefore, luminance of the first pixel area for an input grayscale of a middle grayscale or lower may be increased. Accordingly, when an image is displayed based on input image data of a middle grayscale (for example, about 100 grayscales) or lower, a difference in luminance between the first and second pixel areas having different resolutions may be minimized.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

a pixel unit including first pixels disposed in a first pixel area and second pixels disposed in a second pixel area; and a controller configured to correct grayscales of a first image data corresponding to the first pixel area based on a dimming level defining a maximum luminance at which the pixel unit is able to emit light, wherein:

the controller is configured to supply data signals to the pixel unit based on the corrected first image data and second image data corresponding to the second pixel area;

a luminance of the first pixel is lower than a luminance of the second pixel responding to input grayscales in a first grayscale range; and a number of the first pixels disposed per unit area is less than a number of the second pixels disposed per unit area.

2. The display device of claim 1, wherein the luminance of the first pixel is higher than the luminance of the second pixel responding to input grayscales in a second grayscale range.

3. The display device of claim 2, wherein the input grayscales in the second grayscale range are lower than the input grayscales in the first grayscale range.

4. The display device of claim 3, wherein:

the input grayscales in the first grayscale range are higher than a limit grayscale; and the input grayscales in the second grayscale range are lower than the limit grayscale.

5. The display device of claim 4, wherein the luminance of the first pixel is limited to a luminance corresponding to the limit grayscale.

6. The display device of claim 1, wherein the luminance of the first pixel is same as the luminance of the second pixel responding to input grayscales in a second grayscale range.

7. The display device of claim 6, wherein the input grayscales in the second grayscale range are lower than the input grayscales in the first grayscale range.

8. The display device of claim 7, wherein:

the input grayscales in the first grayscale range are higher than a limit grayscale; and the input grayscales in the second grayscale range are lower than the limit grayscale.

9. The display device of claim 8, wherein the luminance of the first pixel is limited to a luminance corresponding to the limit grayscale.

10. A controller for a display device including a pixel unit including first pixels disposed in a first pixel area and second pixels disposed in a second pixel area, the controller comprising:

a first circuit configured to correct grayscales of a first image data corresponding to the first pixel area based on a dimming level defining a maximum luminance at which the pixel unit is able to emit light; and a second circuit configured to supply data signals to the pixel unit based on a corrected first image data and second image data corresponding to the second pixel area, wherein:

a luminance of the first pixel is lower than a luminance of the second pixel responding to input grayscales in a first grayscale range; and a number of the first pixels disposed per unit area is less than a number of the second pixels disposed per unit area.

11. The controller of claim 10, wherein the luminance of the first pixel is higher than the luminance of the second pixel responding to input grayscales in a second grayscale range.

12. The controller of claim 11, wherein the input grayscales in the second grayscale range are lower than the input grayscales in the first grayscale range.

13. The controller of claim 12, wherein:

the input grayscales in the first grayscale range are higher than a limit grayscale; and the input grayscales in the second grayscale range are lower than the limit grayscale.

14. The controller of claim 13, wherein the luminance of the first pixel is limited to a luminance corresponding to the limit grayscale.

15. The controller of claim 10, wherein the luminance of the first pixel is same as the luminance of the second pixel responding to input grayscales in a second grayscale range.

16. The controller of claim 15, wherein the input grayscales in the second grayscale range are lower than the input grayscales in the first grayscale range.

17. The controller of claim 16, wherein:

the input grayscales in the first grayscale range are higher than a limit grayscale; and the input grayscales in the second grayscale range are lower than the limit grayscale.

18. The controller of claim 17, wherein the luminance of the first pixel is limited to a luminance corresponding to the limit grayscale.

* * * * *